United States Patent [19]

Croxton

[11] Patent Number: 4,892,449
[45] Date of Patent: Jan. 9, 1990

[54] RELEASABLE FASTENER WITH GAUGE, AND METHOD

[75] Inventor: Malcolm A. Croxton, Lomita, Calif.

[73] Assignee: Northrop Corporation, Hawthorne, Calif.

[21] Appl. No.: 162,726

[22] Filed: Mar. 1, 1988

[51] Int. Cl.⁴ .................... F16B 13/06; G01B 5/00
[52] U.S. Cl. ........................ 411/54; 411/14; 33/806; 33/810; 269/48.3
[58] Field of Search .............. 33/143 M, 143 R, 783, 33/806, 809, 810, 836; 411/14, 54, 341, 343; 269/48.2, 48.3, 48.4, 49; 7/164; 29/525.1, 525.2, 720, 721

[56] References Cited

U.S. PATENT DOCUMENTS

| | | | |
|---|---|---|---|
| 1,375,747 | 4/1921 | Zigray | 33/143 M |
| 2,294,013 | 8/1942 | Wallace | 269/48.4 |
| 2,295,783 | 9/1942 | Greenleaf | 33/143 M |
| 2,354,480 | 7/1944 | Rossmann | 269/48.4 |
| 2,365,787 | 12/1944 | Wallace | 269/48.4 |
| 2,398,644 | 4/1946 | Johnson | 269/48.2 |
| 2,439,531 | 4/1948 | Wallace | 269/48.4 |
| 2,446,030 | 7/1948 | Tunnard-Moore | 269/48.2 |
| 2,484,458 | 10/1949 | Modrey | 269/48.2 |
| 2,755,541 | 7/1956 | Kruger | 81/426 X |
| 2,894,331 | 7/1959 | Stratman | 33/143 R |
| 3,144,804 | 8/1964 | Harwood | 269/48.3 |
| 3,144,805 | 8/1964 | Lee | 269/48.3 |
| 3,260,151 | 7/1966 | Jones | 269/48.3 |
| 3,289,525 | 12/1966 | Lee | 269/48.3 |
| 3,568,562 | 3/1971 | Harwood | 269/48.3 |

FOREIGN PATENT DOCUMENTS 273972  5/1930  Italy .................... 33/143

*Primary Examiner*—Neill R. Wilson
*Attorney, Agent, or Firm*—Terry J. Anderson; Robert B. Block

[57] ABSTRACT

A scaled releasable fastener for temporarily joining a plurality of sheets through apertures located in the sheets has a body with a work engaging surface and an opposite surface. The body includes a longitudinal bore extending through the body from the work engaging surface to the opposite surface. A pair of laterally expandable work engaging pins are positioned in the bore. Each of the pins has a work engaging shoulder. A spreader member is fixedly carried by the body and is positioned between the work engaging pins for laterally spreading the pins apart upon retraction of the pins into the bore. An elongated element is positioned in the bore in association with the pins for moving the pins in the bore. A portion of the elongated element extends out of the body from the opposite surface of the body with the remaining portion of the elongated element located in the bore and connected to the pins. Indicia marks are located on the elongated element to be readable against the opposite surface of the body. The indicia marks are calibrated with respect to the opposite surface of the body to indicate the axial spacing between the shoulders of the pin and the work engaging surface of the body.

10 Claims, 1 Drawing Sheet

RELEASABLE FASTENER WITH GAUGE, AND METHOD

BACKGROUND OF THE INVENTION

This invention is directed to improved releasable fasteners for holding a plurality of sheets together wherein the improved fasteners include locating indicia markings on an activating element of the fastener with the indicia markings being readable against a fixed location on the body of the fasteners to indicate the thickness of the sheets which are connected together by the fasteners.

In many industries, particularly the aircraft industry releasable fasteners are utilized to clamp together several sheets of sheet metal by inserting the fasteners through aligned apertures in the sheet metal. In many assemblies as, for instance, aircraft assemblies, only one side of the work area is accessible to the assembler. Particularly useful for this type of assembly work is a releasable fastener which has a pair of pins each of which has a shoulder.

The pins are moved in and out of the body of the fastener and include a spacer bar positioned between the pins. When the pins are extended from the body of the fastener, the shoulders on the pin extend beyond the end of the spacer bar and are biased together reducing the effective diameter of the shoulders. This allows the pins to be inserted into the aligned apertures of an assembly of metal sheets. The pins are then retracted back into the body of the fastener and as the shoulders pass over the space bar they are moved laterally outward with respect to one another effectively increasing the diameter of the shoulders beyond that of the diameter of the aperture opening. The shoulders engage the back sheet of material and bring it and any intermediate sheets of material toward the front sheet of material which abuts against the body of the fastener.

The above described releasable fasteners are ubiquitously used in sheet metal assembly and are available in many sizes, shapes and forms. Typically these releasable fasteners will be color coded to indicate the size aperture they are to be used with as, for instance 3/32, 1/8, 5/32, 3/16, 5/16 and the like. Irrespective of the diameter of the aperture opening which the fastener is manufactured to fit, the fastener might be utilized to temporarily hold 2, 3, 4 or even more individual sheets, plates or other structures in alignment with one another prior to permanently fastening these components together utilizing rivets or other permanent fasteners as, for instance, blind fasteners.

The rivets or other permanent fasteners which are utilized to permanently hold the finished structure together must be properly sized with respect to the overall thickness of the combined sheets in order to effectively join the sheets or plates in a unified structure. If the rivets or permanent fasteners are too long, they will do their job inefficiently and/or will not tighten properly, and if they are too short they cannot be secured to the sheets or plates to attach them together.

Particularly useful for temporarily attaching two or more sheet metal sheets together is a first type of releasable fastener which utilizes an internal spring to withdraw the shoulders on the pins toward the body of the fastener for securing the fastener to the work sheets. These releasable fasteners are utilized with a pair of special pliers adapted to compress a shaft into the body of the fastener. This compresses the spring and protracts the pins out of the body of the fastener to position the shoulders on the pins beyond the spreader reducing the diameter about the shoulders of the pins. Once the fastener is positioned in the aperture openings of the sheet metal tension on the special pliers is released allowing the bias of the spring to withdraw the pins back into the body to secure the fastener on the metal sheets.

Another widely used fastener utilizes a threaded shaft for retracting the pins back into the body of the fastener to secure the fastener to the assembly. This type of releasable fastener is very useful for attaching heavier stock together which requires greater force as, for instance, in attaching sheets or plates to structure elements. In this type of fastener a nut on the threaded shaft is rotated to axially move the shaft and in doing so retract the pins back into the body of the fastener. Typically this type of fastener is utilized with a torque limiting rotatable driving tool to speed up assembly.

In modern aircraft construction, different thicknesses of sheet metal, plates or structural elements are utilized and a different number of sheets are utilized in a variety of places in the aircraft. Further, sealant is often positioned between the individual sheets to further adhere the sheets to one another in addition to securing of the sheets, plates and structural elements together by rivets, bolts, fasteners and the like.

While in an exposed area, the thickness of the sheets and/or the number of the sheets may be readily apparent to an experienced assembler, in blind areas this is not the case. Typically in a modern aircraft blind areas as, for instance, tail assemblies, wing assemblies and the like constitute a large percentage as, for instance about 30 percent or more, of the aircraft structure.

If an inappropriate sized fastener is applied to an assembly of sheets and only after the fastener is secured is it evident that its size was inappropriate, the fastener must be removed and the properly sized fastener applied. For rivets, blind fasteners and the like this usually requires drilling of the inappropriate fastener from the sheets. Not only is this a labor consuming process, but in a blind area the internal portion of the fastener must also be removed. It can not be allowed to drop into the blind area of the aircraft. It is evident that it would be extremely inappropriate to have loose pieces of rivets or blind fasteners flying around within the internal structure of a high speed aircraft which can undergo many times the force of gravity during turns, banks and the like. Thus, it is very important that the correct sized fastener be utilized to join a plurality of sheet metal sheets, plates or structural assemblies.

Heretofore special scales were utilized to measure the thickness of a plurality of sheets comprising an assembly of sheets. These scales have a stepped surface on one end of a probe on the scale. The probe is pushed through the aperture and stepped surface hooked against the back sheet. The thickness of the sheet is then read against the scale by reading the surface of the top sheet or outside sheet against the scale.

With the increased use of sealants between individual sheets in an assembly of sheets the use of this scaled technique is not accurate unless it is known that the sheets are held in a very tight registry with respect to one another. Measurement of the thickness of an assembly of sheets or plates through an opening may not accurately reflect the thicknesses of the sheets and plates because of bulging or the like by sealant located between the sheets. This necessitates securing the sheets together with one of the above releasable fasteners to compress and spread the sealant and then removing the fastener and measuring the thicknesses of the sheet followed by repositioning of the fastener back in the aperture.

This process is often complicated because the assembly in one portion of the aircraft may span over several shifts of workers. To assure that they are using the proper size fasteners each shift of workers must withdraw the fasteners and measure the thickness of the sheets and then reinsert the fasteners. This is a labor intensive and thus expensive operation.

BRIEF DESCRIPTION OF THE INVENTION

In view of the above it is evident that there exists a need for new and improved releasable fasteners for aperture aligned sheets or plates to not only hold the sheets and plates in an assembled relationship but also to indicate the combined thickness of the sheets and plates. It is a broad object of this invention to provide such new and improved fasteners. It is a further object of this invention to provide fasteners which can be utilized in the same manner as prior known fasteners and thus require no additional training or machinery for their use in assembly operations.

These and other objects as will become evident from the remainder of this specification can be satisfied in accordance with the present invention in a releasable fastener which includes a body with the body having a work engaging surface and an opposing surface. The body includes a longitudinal bore which extends through the body from the work engaging surface to the opposing surface. A pair of laterally expandable work engaging pins are movably located in the bore in the body and are retractable and protractable through the work engaging surface. Each of the pins includes a work engaging shoulder located on the end of the pin distal from the body. A spreader member is fixedly carried on the body and is positioned between the work engaging pins for laterally spreading the pins apart upon retraction of the pins into the bore. A pin moving means for moving the pins in the bore is associated with the body. The pin moving means includes an elongated element movably positioned in the bore with a portion of the element extending out of the body from the opposite surface and with a further portion of the elongated element operatively connected with the pins in the bore. Retraction of the elongated element into the bore results in protraction of the pins from the bore and protraction of the elongated element out of the bore results in retraction of the pins into the bore. Indicia means are provided on the elongated element for indicating the degree of protraction of the elongated element from the opposite surface with this being calibrated so as to indicate the axial spacing between the shoulders on the pins and the work engaging surface.

Depending upon the type of releasable fastener utilized, the elongated element can be formed as an elongated cylindrical shaft or an elongated threaded cylindrical shaft. For an elongated cylindrical shaft the indicia means can comprise indicia marks circumferentially scribed on the cylindrical surface of the elongated element or for both an elongated cylindrical shaft and a threaded elongated cylindrical shaft a portion of the elongated cylindrical or threaded cylindrical can be flattened by truncating the cylindrical surface of the shaft with a plane and locating the indicia markings on the flat planar area formed by this truncation of the cylindrical surface. For a fastener utilizing a threaded shaft the indicia on the threaded shaft can be indexed with respect to a drive nut utilized to move the threaded shaft in and out of the body of the fastener.

By calibrating the indicia marks on the elongated element of the fastener to the distance between the shoulders on the pin and the work engaging surface, the thickness of the work piece as is represented by the distance between the shoulders on the pin and the work engaging surface of the body is readily determined by simply reading the indicia on the elongated element against a reference on the body of the fastener.

Further the objects of the invention can be accomplished in a process of indicating the thickness of a composite work piece formed by a plurality of work sheets by selecting a releasable fastener which has a body with an axial bore extending through the body and a work engagable surface located on the body. A pair of laterally expandable work engaging pins are movably positioned in the body and extend from the work engaging surface. Each of the pins includes a work engaging shoulder. A spreader member is located on the body and positioned between the pins for laterally spreading the pins. An elongated element is positioned partially external of the body and partially within the body in association with the pins. The elongated element is movable in the body to move the pins relative to the work engaging surface and in doing so varies the portion of the elongated element in the body and the portion external of the body. An array of calibrated indicia is located on the elongated element in a position on the elongated element so as to be indicative of the portion of the elongated element which is external of the body. The indicia is calibrated such that the distance between the shoulders on the pins and the work engagable surface is related to that portion of the elongated element which is external of the body. At least one aperture is formed in each of the work sheets which forms the work piece and these apertures are aligned. The fastener is positioned in the apertures by retracting a greater portion of the elongated element into the body to protract the pins away from the work surface and the pins then positioned in the aperture with the work engaging surface flush against an outermost sheet on one side of the work piece. The pins are retracted towards the body and the elongated element concurrently protracted from the body until the shoulders on the pins firmly contact the outermost sheet of the other side of the work piece to squeeze the sheets of the work piece together. The thickness of the composition work piece is then indicated by noting the portion of the elongated element which is protracted from the body as is indicated by the indicia.

BRIEF DESCRIPTION OF THE DRAWINGS

This invention will be better understood when taken in conjunction with this specification and the accompanying drawings wherein.

DETAILED DESCRIPTION OF PREFERRED EMBODIMENTS OF THE INVENTION

Representative of fasteners utilized to clamp sheets or plates together utilizing apertures in these sheets or plates are U.S. Pat. Nos. 2,398,644 to Johnson, 2,439,531 to Wallace, 2,446,030 to Tunnard-Moore and 2,484,458 to Modrey all of which utilize compression springs in the body of the fastener to exert temporary force for fastening the sheets or plates together. Further, U.S. Pat. Nos. 3,144,804 to Harwood, 3,144,805 to Lee, 3,260,151 to Jones, 3,289,525 to Lee and 3,568,562 to Harwood are illustrative of fasteners which utilize a threaded shaft of one form or the other or a threaded body element moving on a further threaded body element to exert the clamping force for retaining sheets or plates together.

This last group of patents together with the prior mentioned U.S. Pat. No. 2,439,531 to Wallace utilize shouldered pins which are laterally spread by a spreader member to adhere the fasteners to the apertures in the sheets or plates. In addition to utilizing laterally spreadable pins for securing the fastener to the work piece the above referred U.S. Pat. No. 3,568,562 to Harwood includes additional components within the fastener for exerting a predetermined clamping force and the above referred U.S. Pat. No. 3,260,151 to Jones utilizes additional components within the fastener for facilitating removal of the fastener.

Figure 4:
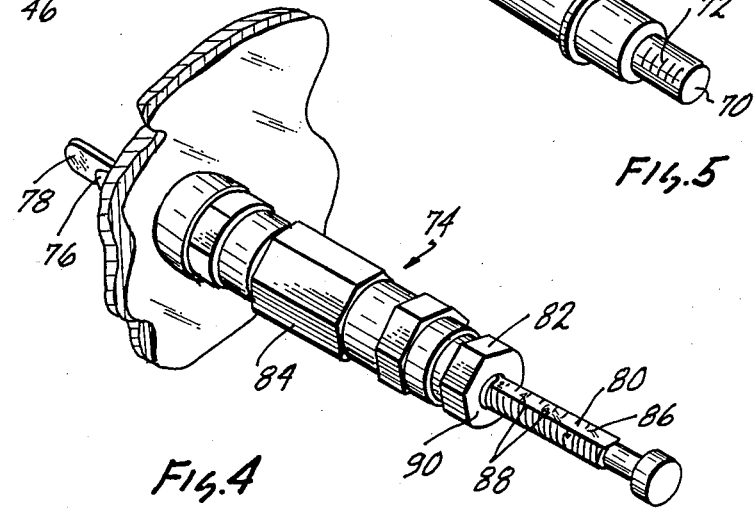
FIG. 4 is an isometric view of a further fastener of the invention and also shows this fastener on a work piece.

Since a variety of fasteners of the type noted above are known, for brevity of this specification in discussing the illustrative fasteners of FIG. 4 of the drawing, the internal structure of the fastener is not shown. Reference is made to the above referred to United States patents as, for instance, the Harwood 3,144,804 patent, for internal construction of a fastener which utilizes a rotating nut on a threaded shaft to retract the ends of the fastener into the body of the fastener for adhering the fastener to the work piece.

The above referred to Wallace patent 2,439,531 has an adjustable sleeve which allows the fastener to be "customized" for the use of certain thickness of material. However, to utilize this fastener, the thickness of the material must be known prior to location of the fastener on the materials such that the sleeve may be rotated on the fastener. This, in essence, moves the position of the work engaging surface of the fastener with respect to the shoulders on the pins of the fastener to customize the fastener to the prior known thickness of the work piece. This fastener, however, cannot be utilized to obtain the thickness of the work piece since once attached to the work piece markings on the pins of the fastener are completely hidden by the adjustable sleeve.

FIGS. 1, 2, 3 and 5 illustrate a fastener of the invention which utilizes an internal compression spring for retracting pins of the fastener back into the body of the fastener for adhering the fastener to the work piece. Fasteners of this type are utilized in conjunction with special pliers as, for instance a commercially available plier identified with the patent number "2,755,541". Insofar as these pliers are known, for brevity of this specification and drawings they are not shown or further described.

Figure 1:
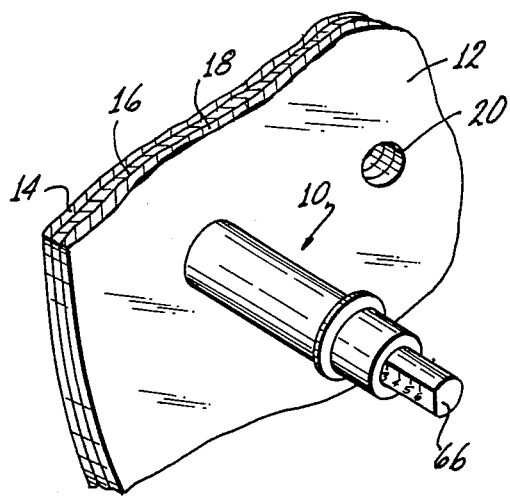
FIG. 1 is a isometric view of an improved fastener of the invention with the fastener shown located on a composite work piece of several sheets of sheet metal.
Figure 2:
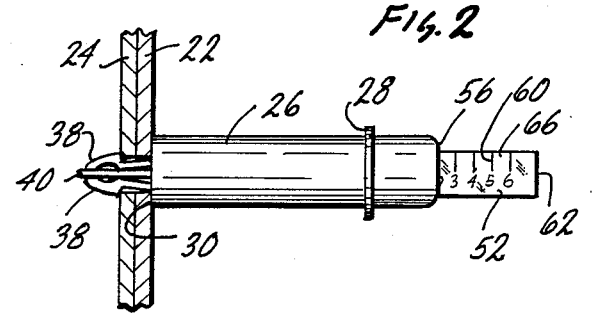
FIG. 2 is a side elevational view in partial section of the fast and work piece of FIG. 1.
Figure 3:
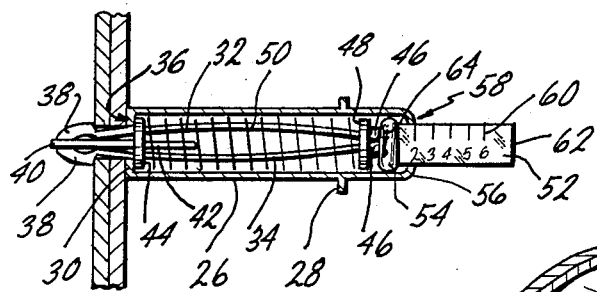
FIG. 3 is a side elevational view in section of the fastener and work piece of FIG. 2.

In FIG. 1 a fastener 10 of the invention is utilized to hold individual sheets of a work piece 12 in alignment with one another. The work piece 12 is composed of three separate sheets 14, 16 and 18 which are sandwiched together. Aligned apertures as, for instance hole 20, are formed in the work piece 12. The fastener 10 of FIG. 1 is positioned in one such hole and is utilized to hold the individual sheets 14, 16 and 18 together as the unified work piece 12 allowing for placement of a permanent fastener in the hole 20 or other such operation as drilling of additional holes. The fastener 10 of FIG. 1 is also shown in FIGS. 2 and 3 except that in these two Figures it is utilized to hold two sheets, sheets 22 and 24 in alignment.

The fastener 10 has an outside body 26 which includes a circumferentially extending flange 28 formed thereon. The flange 28 is utilized in conjunction with the above referred to pliers for manipulating the fastener 10 and locating it on the sheets 22 and 24. A work engaging surface 30 is formed on the body 26 by flanging or swaging the end of the body 26 inwardly.

A pair of engaging pins 32 and 34 pass through an opening 36 in the work engaging surface 30. Formed on the exterior end of each of the engaging pins 32 and 34 are shoulders, collectively identified by the numeral 38. Positioned between the engaging pins 32 and 34 is a spreader member 40.

The spreader member 40 is shaped as a T shaped plate. For identification, the cross portion of the T shaped plate is separately identified by the numeral 42 and as is seen in FIG. 3 is located within the interior of the body 26 joined to a bushing 44. The bushing 44 is held within the body 26 against the inside surface of the work engaging surface 30. The interior ends of the engagement pins 32 and 34 are bent over to form outwardly projecting flanges, collectively identified by the numeral 46. A further bushing 48 is positioned inwardly of the flanges 46. A compression spring 50 is positioned between the bushings 44 and 48. Bias of the spring 50 transmitted through the bushing 48 to the flanges 46 and thus the engaging pins 32 and 34 formed therewith urges the pins 32 and 34 inwardly toward a retracted position within the body 26 of the fastener 10.

A cylindrical shaft 52 having a bulbous end 54 on one of its ends is located in association with the pins 32 and 34 and the fastener 10. The bulbous end 54 of the shaft 52 is held within the body 26 by swaging or flanging the opposite end 56 of the body 26. The shaft 52 extends out of the end 56 through an opening 58. A plurality of reference mark indicia 60 are located on the shaft 52.

To attach the fastener 10 to the sheets 22 and 24 the fastener 10 is positioned between jaws of the above referred to plier positioning the end 62 of the shaft 52 against one of these jaws and the flange 28 on the body 26 against the other jaw. The plier is then manipulated to bring its jaws together which concurrently depresses or retracts the shaft 52 into the body 26 of the fastener 10. The bulbous end 54 of the shaft 52 pressing against the outwardly extending flanges 46 on the engaging pins 32 and 34 protract or extend the engaging pins out of the body 26 until the shoulders 38 of the pins extend beyond the spreader member 40.

As is evident from FIG. 3, a curve is formed in the engagement pins 32 and 34. Because of this curve during extension of the pins 32 and 34 out of the opening 36 in the work engagement surface 30 and beyond the end of the spreader 40, the shoulder areas 38 of the pins 32 and 34 laterally move together once they are beyond the end of the spreader 40. This reduces the diameter across the shoulder areas 38 allowing for the pins to be passed through an appropriate aperture in the sheets 22 and 24.

With the work engaging surface 30 pressed against the top surface of the sheet 22 the pressure on the plier is released which allows the compression spring 50 to bear against the bushings 44 and 48 to retract the pins 32 and 34 back into the body 26 and at the same time extend or protract the shaft 52 outward from the opening 58 of the body 26. When the shoulders 38 on the pins 32 and 34 engage the spreader member 40 they are spread laterally outwardly such that their effective diameter is greater than the diameter of the aperture in which they are located. When the shoulders abut against the outside surface of the sheet 24 they are locked against this surface since they are of a greater diameter than the aperture in this surface. This locks the fastener 10 to the sheets 22 and 24 holding the sheets together.

With the retraction of the pins 32 and 34 back into the body 26, the shaft 52 is concurrently extended or protracted outwardly from the body 26. The amount of extension or protraction of the shaft 52 from the opposite end 56 of the body 26 can be correlated with the position of the shoulders 38 relative to the work engaging surface 40 by calibrating the indicia 60 on the shaft 52 to the distance between the shoulders 38 and the work engaging surface 30. Thus, once a fastener 10 of the invention is attached to a work surface the thickness of that work surface as measured by the distance between the shoulders 38 and the work engaging surface 30 is indicated by the particular indicia marking on the shaft 52 which aligns with the opposite end 56 of the body 26.

The shaft 52 can be joined to the flanges 46 of the pins 32 and 34 as, for instance, via a suitable weld or adhesive shown at 64. When the shaft 52 is fixed to the pins 32 and 34, movement of the shaft 52 is fixed with respect to movement of the pins 32 and 34 and vice versa. Alternatively, shaft 52 need not be fixed to the ends of the pins 32 and 34.

When the shaft 52 is not fixed to the ends of the pins 32 and 34, when the fastener 10 is fixed to a work surface, it is possible to withdraw the shaft 52 outwardly from the body 26 until the bulbous end 54 meets the interior surface of the opposite end 56. If this is done either on purpose or by gravity as, for instance if the fastener is upside down, the indicia marking aligning against the opposite end 56 is not indicative of the distance between the shoulders 38 and the work surface 30, however, by simply pushing the shaft 52 inwardly until it contacts the ends 46 of the pins 32 and 34 the correct indicia indicating the distance between the shoulders 38 and the work surface 30 is aligned with the surface of the opposite end 56 of the body 26 allowing for a reading of the thickness of the sheets 22 and 24.

If the shaft 52 is fixed to the ends of the pins 32 and 34 as, for instance, by the weld or adhesive 64, the fastener 10 at all times indicates the thickness of the sheets it is attached to. If the weld or adhesive 64 is not used, to ascertain the exact thickness of the work sheet to which the fastener 10 is attached a worker very quickly simply pushes the end 62 of the shaft 52 inwardly until it contacts the flanges 46 of the pins 32 and 34.

For those situations where the fasteners 10 will be used in an inverted configuration as, for instance on the bottom of the wing of an airplane or the like, the addition of the weld or adhesive 62 results in the fastener 10 always indicating the correct thickness. In those situations as, for instance on the top of a wing or the like, the addition of the weld or adhesive 62 is not necessary since the shaft 52 will descend by gravity against the flanges 46 of the pins 32 and 34 to correctly indicate the thickness of the work sheet.

Figure 5:
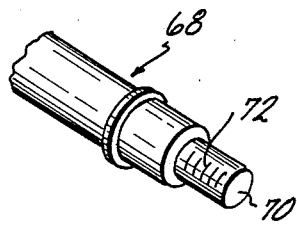
FIG. 5 is a fragmentary isometric view of a modification of the fastener of FIG. 1.

For the fastener 10 of FIGS. 1, 2 and 3 the shaft 52 has been truncated by a plane to form a flat surface 66. The indicia 60 is printed or registered on this flat surface 66. In FIG. 5 a further fastener 68 is illustrated. The fastener 68 is identical to the fastener 10 described above except for the shape of the shaft 52. In the fastener 68 the shaft 70 is completely cylindrical and includes circumferentially extending 72 located thereon.

A further fastener 74 is illustrated in FIG. 4. The fastener 74 is illustrative of fasteners as, for instance, a fastener of the above referred to Harwood 3,144,804 patent, which utilize a nut to move a shaft in and out of the fasteners. Generally fasteners of the type illustrated in FIG. 4 would be utilized to provide clamping pressures for assemblies which include thicker sheets or plates or other structural members which require a higher degree of force to tightly clamp them together. The fastener 74 utilizes pins having shoulders exactly equivalent to those shown for the embodiment of FIGS. 2 and 3. In FIG. 4 an end 76 of one of these pins is shown adjacent to its spreader member 78.

As is described in the above referred to patents as, for instance, the Harwood Pat. No. 3,144,804, the pins of the fastener 76 would be attached to the interior end of a threaded shaft 80. A nut runner 82 is utilized to move the shaft 80 at least in an outwardly direction from the body 84 of the fastener 74 to clamp the fastener to a work piece.

The shaft 80 of the fastener 74 is threaded to accept the nut runner 82. However, it is also truncated by a plane to form a flat surface or area 86 thereon. Indicia markings 88 are then stamped or printed on this flat surface 86. The flat surface 86 takes away from certain parts of the threaded area of the shaft 80, however, since it is a removal process, i.e. actually removing portions of the thread, the nut runner 82 still threads on the shaft 80 and is utilized for movement of the shaft 80 relative to the body 84 of the fastener 74.

In an equivalent manner described for the fastener 10 above, the upper or outside surface 90 of the nut runner 82 is utilized as an indicating surface to read the indicia 88 against for determining the thickness of the work pieces to which the fastener 74 is attached The lower surface, not separately identified or numbered, of the nut runner 82, of course, rotates against the body 84 to transmit the thrust necessary to extend or protract the shaft 80 out of the body 84 to clamp the fastener 74 to a work piece.

This invention has been described in conjunction with the illustrative embodiments enumerated above. It would be evident to those skilled in the art that various alterations, modifications and variations may be made to the illustrative embodiments without departing from the spirit and scope of the claims appended hereto. In view of this this invention is not to be construed as being limited to only the illustrative embodiments, but should only be construed in view of the appended claims.

What is claimed is:

1. A releasable fastener with thickness gauge for use in positioning the aligned holes of overlaid workpieces for temporarily fastening them together while simultaneously gauging and reading out the combined thickness of such workpieces at the aligned holes from the front side to the back side thereof, comprising:

an elongate body having first and second ends and a bore opening therein from said first end to said second end, means surrounding the bore opening at the first end for forming a work contact surface for reproducibly contacting the workpieces on the front side, a pair of laterally expandable elongate pins disposed in and captured in the bore for sliding movement between extended and retracted positions, each pin having a working engaging radially outwardly facing shoulder, spring means for biasing said pins toward each other, spreader means interposed in a fixed position between the pins and having a limited length so that when the pins are extended beyond the spreader means, they are biased by the spring means into a smaller lateral extent than when retracted over the spreader means, plunger and gauge means mounted in said bore for movement in the bore in contact with the end of said pins remote from the work engaging shoulder for moving said pins from a normally retracted position into a projected position extending outwardly through said first end and work contact surface, said plunger and gauge means extending in coaxial alignment outwardly from the second end of the body an amount proportional to the position of the pins, said plunger and gauge means including means forming a scale thereon, means located in the second end of the body for reading said scale, said scale being referenced to said reading means to show depth of pin position relative to the work contact surface at the first end of the body and thus the thickness of interposed workpieces, means on the body adapted to be gripped to allow movement of the plunger and gauge means and pins between a retracted position and an extended position for being inserted through the aligned holes in the workpieces, which, when then retracted, causes the pins to move over the spreader with their shoulders engaging the back side of the workpieces, with the work contact surface of the fastener body contacting the front side of the workpieces, and compression spring means disposed in said bore and about said pins and abutting interiorly at the first end of the body and at the internal end of the pins for urging the pins into retracted position.

2. A releasable fastener of claim 1 wherein:

said means forming a scale comprises a series of scribe lines located on said elongated element in a spaced array on said plunger.

3. A releasable fastener of claim 1 including:

at least said portion of said elongated element which extends from said second end being formed as an elongated cylindrical shaft, means forming an elongate flat area located on said portion of said elongated element which extends from said second end, said flat area formed by a plane truncating the cylindrical surface of said shaft, and said scale means located on said flat area.

4. A releasable fastener of claim 1 including:

at least said portion of said elongated element which extends from said opposite surface being formed as an elongated cylindrical shaft having a cylindrical surface, and said scale means comprising a spaced array of circumferentially extending lines located on said cylindrical surface of said shaft.

5. A releasable fastener of claim 1 wherein:

said pins are fixedly joined to said plunger whereby said pins and said plunger form a unitary assembly for movement in said bore in said body.

6. A releasable fastener with thickness gauge for use in positioning the aligned holes of overlaid workpieces for temporarily fastening them together while simultaneously gauging and reading out the combined thickness of such workpieces at the aligned holes from the front sides to the back side thereof, comprising:

an elongate body having first and second ends and a bore opening therein from said first end to and through said second end, means surrounding the bore opening at the first end for forming a work contact surface for reproducibly contacting the workpieces on the front side, a pair of laterally expandable elongate pins disposed in and captured in the bore for sliding movement between extended and retracted positions, each pin having a work engaging radially outwardly facing shoulder, spring means for biasing said pins toward each other, spreader means interposed in a fixed position between the pins and having a limited length so that when the pins are extended beyond the spreader means, they are biased by the spring means into a smaller lateral extent than when retracted over the spreader means, plunger and gauge means mounted in said bore for movement in the bore in contact with the end of said pins remote from the work engaging shoulder for moving said pins from a normally retracted position into a projected position extending outwardly through said first end and work contact surface, said plunger and gauge means extending in coaxially alignment outwardly from the second end of the body an amount proportional to the position of the pins, said plunger and gauge means including means forming a scale thereon, means disposed in said bore and about said pins and abutting interiorly at the first end of the body and at the internal end of the pins for yieldably urging the pins into retracted position, and means on the body adapted cooperating with the second end of the plunger so that said second end may be pushed toward the body to be gripped to move the plunger and gauge means and pins between a retracted position and an extended position for being inserted through the aligned holes in the workpieces, which, when then retracted, causes the pins to move over the spreader with their shoulders engaging the back side of the workpieces, with the work contact surface of the fastener body contacting the front side of the workpieces, said plunger including an elongate cylindrical threaded shaft having ends, said pins fixed to one end of said threaded shaft, said plunger moving means including a threaded drive nut located on said threaded shaft adjacent to said opposite surface of said body, said drive nut for at least retracting said threaded shaft from said body to move said shoulders on said pins towards said work engaging surface, said drive nut rotating over said scale means on said threaded shaft, said scale means on said threaded shaft being indexed with said drive nut to show depth of pin position relative to the work contact surface at the first end of the body and thus the thickness of the interposed workpieces.

7. A releasable fastener of claim 6 wherein:

said drive nut has an upper and a lower surface, said drive nut lower surface positioned proximal to said second end of said body, and said drive nut top surface comprising a fixed reference surface for indexing with said scale means.

8. A releasable fastener of claim 6 wherein said means forming a scale comprises a series of scribe lines located on said elongated element in a spaced array on said plunger.

9. A releasable fastener of claim 6 wherein said pins are fixedly joined to said plunger whereby said pins and said plunger form a unitary assembly for movement in said bore in said body.

10. A releasable fastener of claim 9 wherein said plunger includes an elongate generally cylindrical threaded shaft having ends, said pins fixed to one end of said threaded shaft, and further including an elongated flat area located on the other of said ends of said threaded shaft, said flat area formed by a plane truncating the cylindrical surface of said shaft, and wherein said scale means is located on said flat area.

* * * * *